Sept. 22, 1970    J. C. MABBETT    3,530,309

ELECTRONIC SWITCHING CIRCUIT

Filed April 14, 1967

INVENTOR
JOHN C. MABBETT
BY
Edward A. Sokolski
ATTORNEY

United States Patent Office 3,530,309
Patented Sept. 22, 1970

1

3,530,309
ELECTRONIC SWITCHING CIRCUIT
John C. Mabbett, Hollywood, Calif., assignor to Crosby Research, Inc., Los Angeles, Calif., a corporation of California
Filed Apr. 14, 1967, Ser. No. 631,068
Int. Cl. H03k 17/00
U.S. Cl. 307—246                11 Claims

ABSTRACT OF THE DISCLOSURE

An electronic switching control circuit is placed in series between a load, the actuation of which is to be controlled, and a power source for supplying such load. The electronic switching control circuit operates responsively to a resistive-capacitive charging circuit which is momentarily connected to the control circuit by means of a momentary contact control switch. Successive momentary actuations of the control switch cause the switching control circuit to be alternately activated and deactivated as the capacitor of the charging circuit alternately is charged in opposite directions.

This invention relates to electronic switching circuits and more particularly to such a circuit which operates to alternately connect and disconnect a power source to a load in response to successive momentary actuations of a control switch.

Momentary contact switches are a simple highly economical form of electrical switch which is generally utilized in conjunction with a relay mechanism or an electronic control circuit to control the application of power to electrical equipment. In view, however, of the relative complexity and/or relatively high cost of the control circuitry involved, this type of switching has not heretofore been feasible for everyday switching applications such as, for example, in home appliances and home lighting switches.

The switching circuit of this invention provides a simple and economical switching circuit suitable for use with momentary contact switches which makes feasible the utilization of this type of switch for everyday applications. Along with its simplicity and economy the circuit of this invention has highly reliable operational characteristics.

The circuit of this invention achieves these end results by utilizing a resistive-capacitive charging circuit for controlling the on-off switching operation in response to the momentary actuation of the control switch. The charging circuit alternately charges in opposite directions with successive actuations of the momentary contact switch and is connected with such actuation to an electronic switching control circuit which is either activated or deactivated, depending on the direction of charge of the capacitor of the charging circuit. The electronic switching control in turn controls the operation of an electronic switch which is connected between the power source and the load which comprises the device to be controlled.

It is therefore an object of this invention to provide an improved switching circuit for use with a momentary contact switch.

It is a further object of this invention to provide a switching circuit for utilization with a momentary contact switch which is highly economical.

It is still another object of this invention to facilitate the utilization of momentary contact switches in everyday home applications.

It is still a further object of this invention to provide a switching circuit for utilization with momentary contact switches which has highly reliable operational characteristics.

Other objects of this invention will become apparent from the following description taken in connection with the accompanying drawings, of which:

Figure 1:
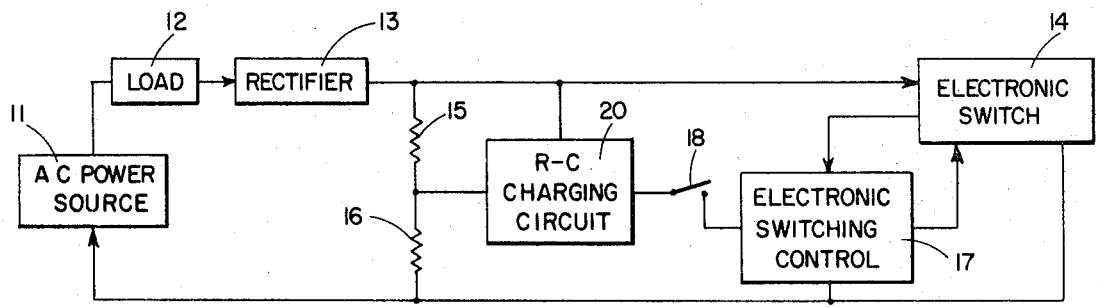
FIG. 1 is a block diagram illustrating the basic elements of the invention.

Referring now to FIG. 1, AC power source 11 is connected to load 12 with the return current path from the load to the power source being through electronic switch 14. Rectifier 13 is interposed between load 12 and electronic switch 14 and converts the AC output of the power source to DC. Electronic switching control 17 is connected to electronic switch 14 in a feedback circuit and controls the operation of the electronic switch. Thus when electronic switching control 17 is deactivated so also is electronic switch 14 and when electronic switching control 17 is activated so also is the electronic switch.

Initially, i.e. before control switch 18 has been actuated, electronic switching control 17 and electronic switch are in the deactivated state, and the current path from power source 11 to load 12 is interrupted by electronic switch 14 so that no power is being supplied to the load. Under such conditions, R-C charging circuit 20 which comprises a charging capacitor, is charged in a predetermined direction by the potential across resistor 15 which is developed by means of the voltage divider comprising resistors 15 and 16. When control switch 18 is momentarily closed, the potential across the capacitor in R-C charging ciricuit 20 is supplied to electronic switching control 17 to activate this switching control. This in turn causes the activation of electronic switch 14 thereby supplying power to load 12. Electronic switch 14, as already noted, is connected in a feedback circuit with electronic switching control 17 so that once activated they both remain in the activated state until a subsequent actuation of control switch 18 occurs as now to be explained.

When switch 18 is momentarily actuated, the capacitor of R-C charging circuit 20 discharges through the current path provided by electronic switch 14 and electronic switching control 17 and then charges in a reverse direction, all of this occurring during the momentary actuation of the switch. The next time switch 18 is actuated, the charge on the capacitor of charging circuit 20, which is in a reverse direction from the initial charge, provides a pulse to electronic switching control 17. This pulse drives the switching control to the deactivated condition thereby deactivating electronic switch 14. Charging circuit 20 will then recharge in the initial charging direction setting the circuit up for reactuation of electronic switching control 17 with the next actuation of control switch 18. Thus, electronic switch 14 is alternately activated and deactivated in response to successive actuations of switch 18, and in this manner the power to load 12 is switched on and off. It is to be noted that power source 11 may be a direct current source, in which case rectifier 13 is not required.

Figure 2:
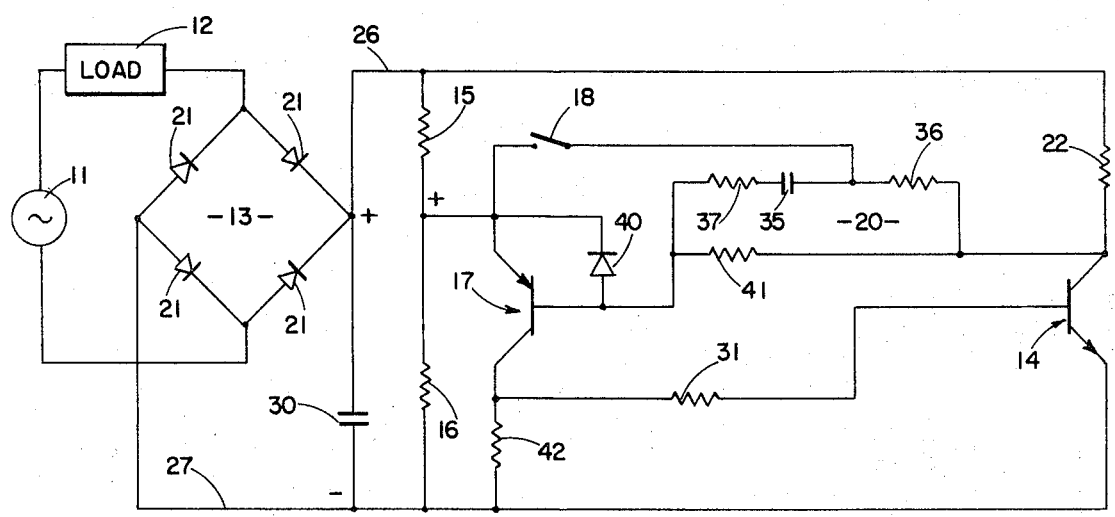
FIG. 2 is a schematic drawing of a first embodiment of the device of the invention.

Referring now to FIG. 2, a first embodiment of the device of the invention is illustrated. AC power source 11 supplies power to load 12 which may comprise a light bulb or other electric device. Connected in series with power source 11 and load 12 are rectifier 13 which comprises a plurailty of diodes 21 connected in a conventional bridge rectifier circuit, resistor 22, and transistor 14 which functions as an electronic switch. When transistor 14 is at cutoff, the circuit is broken and no power is supplied to load 12. Conversely, when transistor 14 is in its conductive state, load 12 is energized. Rectifier 13 rectifies the AC output of power source 11 providing a DC potential in the indicated polarity between lines 26 and 27. Resistors 15 and 16 form a voltage divider between lines 26 and 27 with capacitor 30 acting as a filter to smooth out the ripple in the rectified direct current.

Initially, i.e. prior to any actuation of switch 18, transistor 17 which provides an electronic switching control for transistor 14 is biased to cutoff. Such a cutoff condition of PNP type transistor 17 is implemented by virtue of the fact that the base of this transistor is maintained at a more positive potential than the emitter thereof, this by virtue of the fact that the emitter potenial is dropped so that it is below that of the base by means of the voltage divider including resistors 15 and 16. With transistor 17 at cutoff, transistor 14 is also maintained at cutoff, this in view of the fact that the collector of transistor 17 is connected to the base of transistor 14 through resistor 31. With transistor 17 at cutoff, there is no potential developed across resistor 42 and therefore no forward bias between the base and emitter of NPN type transistor 14 between which resistor 42 is connected.

It is to be noted that transistors 17 and 14 are complementary, that is, transistor 17 is of the PNP type while transistor 14 is of the NPN type. It is also to be noted that these transistors are preferably silicon types which have a higher firing potential than germanium transistors, with transistor 14 having an adequate current capacity to handle the current required by load 12.

With transistors 17 and 14 at cutoff, capacitor 35 of resistive-capacitive charging circuit 20 charges through the current path including resistors 22, 36 and 37, and diode 40, the side of capacitor 35 connected to resistor 36 being charged positively with respect to the side of the capacitor connected to resistor 37.

When switch 18 is momentarily actuated, a forward bias in the form of a sharp transient pulse is applied between the base-emitter junction of transistor 17 which causes this transistor to go to saturation conduction. This is by virtue of the fact that the positively charged side of capacitor 35 is connected through switch 18 to the emitter of transistor 17 while the negatively charged side of capacitor 35 is connected through resistor 37 to the base of the transistor. With transistor 17 conducting at saturation, a forward biasing potential is supplied through resistor 31 to the base-emitter junction of switching transistor 14, this by virtue of the potential developed across resistor 42 with the conduction of transistor 17. Transistor 14 is thus driven to saturation conduction along with transistor 17. With such saturation conduction, the collector of transistor 14 drops to close to the potential of line 27. The collector of transistor 14 is connected through resistor 41 to the base of transistor 17 and thus a feedback is provided which tends to maintain the saturation conduction of transistor 17.

The RC time constant of charging circuit 20 is made relatively low so that in the moment that switch 18 is closed, capacitor 35 completely discharges and recharges in the opposite direction through the current path provided by the base-emitter junction of transistor 17 and transistor 14. The side of capacitor 35 connected to resistor 36 thus assumes a potential close to that of line 27 (this by virtue of the fact that the collector of transistor 14 is at close to the emitter potential thereof when the transistor is at saturation). The side of capacitor 35 connected to resistor 37 charges to a positive potential which is close to that at the junction between resistors 15 and 16.

With the saturation conduction of transistor 14 a current path is provided between power source 11 and load 12 to energize the load.

Transistors 17 and 14 remain in their conductive state and load 12 remains energized until switch 18 is again momentarily energized. When switch 18 is again momentarily actuated, capacitor 35 is again connected between the emitter and base of transistor 17. This time, however, with the capacitor charged in a reverse direction, a negative potential in the form of a sharp transient pulse is applied to the emitter of the transistor. This drives transistor 17 to cutoff as the capacitor again discharges through the base-emitter junction of the transistor. When transistor 17 goes to cutoff, the base-emitter junction of transistor 14 is reverse biased driving transistor 14 to the cutoff state also. This cuts off the power to load 12. In this manner, load 12 is alternately energized and deenergized in response to momentary actuation of switch 18.

Figure 3:
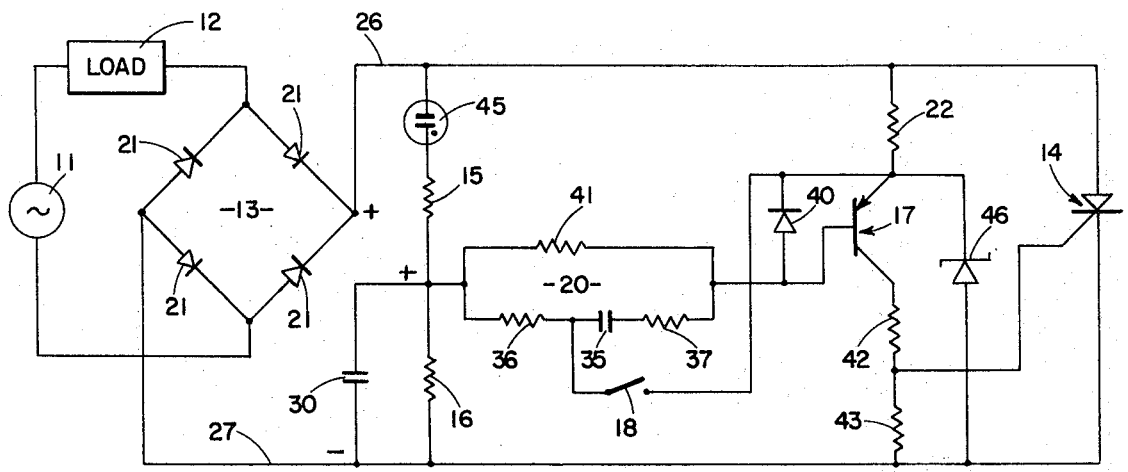
FIG. 3 is a schematic drawing of a second embodiment of the device of the invention.

Referring now to FIG. 3, a second embodiment of the device of the invention is illustrated. This embodiment functions in the same general fashion as that of FIG. 2 except for the fact that a silicon controlled rectifier is utilized for the electronic switch with minor modifications being made to the circuitry to efficiently accommodate this change. The same numerals are utilized in FIG. 3 to identify like components shown in FIG. 2. Initially, let us assume that transistor 17 and silicon controlled rectifier 14 which functions as the electronic switch are at cutoff. Under such conditions, there is no conduction through load 12, and the line voltage appears across neon bulb 45 firing this bulb. At the same time Zener diode 46 fires to establish a predetermined potential at the emitter of transistor 17. This potential is below that established at the base of the transistor by virtue of the voltage drop across neon bulb 45 and resistor 15. The emitter-base junction of the transistor thus is back biased maintaining the transistor at cutoff. Under such conditions, capacitor 35 charges through the current path including resistors 36, 37, 22 and diode 40 in a direction such that the side of capacitor 35 connected to resistor 36 has a positive potential as compared with the side of the capacitor connected to resistor 37. When switch 18 is momentarily actuated, a positive potential in the form of a sharp transient pulse is applied to the emitter of PNP type transistor 17, and this transistor is forward biased to cause it to go to a saturation conduction state. With the conduction of transistor 17 a potential is developed across resistor 43 which provides a firing potential to the control element of silicon controlled rectifier 14, causing the silicon controlled rectifier to go to a conduction state thus energizing load 12. As for the previous embodiment, the resistive-capacitive charging circuit 20 has a relatively low time constant so that with the momentary actuation of switch 18, capacitor 35 fully discharges and recharges in the opposite direction. Thus, as for the previous embodiment, when switch 18 is next actuated a reverse biasing pulse is applied across the base-emitter junction of transistor 17 driving this transistor to cutoff thereby causing the deenergization of silicon controlled rectifier 14.

Various types of switching element combinations other than those shown in FIGS. 2 and 3 can be utilized, the essential common denominator being the utilization of resistive capacitive charging circuit 20, so that it charges first in one direction and then the opposite direction with successive actuations of the momentary contact switch, to alternately drive electronic switching control 17 and electronic switch 14 to the conductive and non-conductive states. The component values are not critical in view of the regenerative feedback operation of the electronic switching control and the electronic switch to maintain each other in the conductive or non-conductive state, as the case may be, until the switchover pulses are received from the resistive-capacitive charging circuit. It is to be noted that the triggering provided for the electronic switching control is in the form of a relatively sharp pulse in view of the transient response of the resistor-capacitor circuit to the momentary action of switch 18. Thus, substantially sharper triggering pulses are provided than would be achieved in the absence of such transient action.

The circuit of this invention thus provides simple yet highly effective means for actuating a power circuit in response to a momentary contact switch. Positive on and off activation of a load is achieved in response to successive momentary actuations of a control switch in a highly reliable fashion.

I claim:
1. A switching circuit for controlling the alternate energization and de-energization of a load by a power source in response to successive momentary actuations of a control switch comprising:
   electronic switching control circuit means interposed between the load and the power source for alternately connecting and disconnecting the load and the power source, and
   resistive-capacitive charging circuit means for alternately providing an activation and deactivation signal to said switching control circuit means in response to successive momentary actuations of said control switch, said charging circuit means charging in a first direction when said control circuit means is activated and in a direction opposite said first direction when said control circuit means is deactivated.

2. The circuit as recited in claim 1 wherein said switching control circuit means comprises an electronic switch connected between the power source and the load and an electronic switching control connected to said electronic switch to control the activation and deactivation thereof.

3. The circuit as recited in claim 2 wherein said electronic switching control and said electronic switch are connected to each other in feedback relationship so that they are always activated and deactivated simultaneously.

4. The circuit as recited in claim 2 wherein said electronic switching control comprises a transistor having emitter, base and collector electrodes, said charging circuit comprising a capacitor, said capacitor being connected between the base and emitter electrodes of said transistor when said control switch is actuated.

5. The circuit as recited in claim 4 wherein said electronic switch comprises a second transistor, said second transistor being connected in circuit with said first mentioned transistor so that it is activated when said first mentioned transistor is activated and deactivated when said first mentioned transistor is deactivated.

6. The circuit as recited in claim 4 wherein said electronic switch comprises a silicon controlled rectifier connected in circuit with said transistor, said silicon controlled rectifier being activated when said transistor is activated and deactivated when said transistor is deactivated.

7. The circuit as recited in claim 4 wherein the control switch is interposed between one side of said capacitor and the emitter electrode of said transistor, the other side of said capacitor being connected to the base electrode of said transistor.

8. The circuit as recited in claim 4 including voltage divider means connected in series with said power source having a tap therein for establishing a predetermined potential level, said charging circuit being connected between said tap and said power source.

9. The circuit as recited in claim 4 and further including unidirectional current means connected between the base and emitter electrodes of said transistor for establishing a charge path in one direction for said charging circuit.

10. The circuit as recited in claim 9 wherein said unidirectional current means comprises a diode.

11. A switching circuit for controlling the activation and deactivation of a load by a power source in response to successive momentary actuations of a control switch comprising:
   an electronic switch interposed between the power source and the load and completing the circuit therebetween,
   an electronic switching control connected to said electronic switch to control the activation and deactivation thereof, and
   resistive-capacitive charging circuit means for alternately providing an actuation and a deactuation signal for said electronic switching control in response to successive momentary actuations of said control switch,
   said charging circuit means being coupled to said power source and to said switching control so that it charges in a first direction when said switching control is activated and in a direction opposite said first direction when said switching control is deactivated.

References Cited
UNITED STATES PATENTS

| | | | |
|---|---|---|---|
| 3,235,750 | 2/1966 | Anderson et al. | 307—255 |
| 3,321,641 | 5/1967 | Howell | 307—252 |

STANLEY T. KRAWCZEWICZ, Primary Examiner

U.S. Cl. X.R.

307—241, 252, 255